United States Patent
Liebsch et al.

(10) Patent No.: US 8,660,065 B2
(45) Date of Patent: Feb. 25, 2014

(54) RADIO NETWORK AND A METHOD FOR OPERATING A RADIO NETWORK

(75) Inventors: Marco Liebsch, Heidelberg (DE); Paulo Ferrer Loureiro, Heidelberg (DE); Andreas Kunz, Heddesheim (DE)

(73) Assignee: NEC Europe Ltd., Heidelberg (DE)

( * ) Notice: Subject to any disclaimer, the term of this patent is extended or adjusted under 35 U.S.C. 154(b) by 224 days.

(21) Appl. No.: 13/140,863

(22) PCT Filed: Dec. 21, 2009

(86) PCT No.: PCT/EP2009/009182
§ 371 (c)(1),
(2), (4) Date: Aug. 4, 2011

(87) PCT Pub. No.: WO2010/069601
PCT Pub. Date: Jun. 24, 2010

(65) Prior Publication Data
US 2011/0286395 A1    Nov. 24, 2011

(30) Foreign Application Priority Data
Dec. 19, 2008 (EP) .................................. 08022095

(51) Int. Cl.
*H04L 12/26* (2006.01)
*H04J 1/16* (2006.01)
*G08C 15/00* (2006.01)
*G06F 11/00* (2006.01)
*G01R 31/08* (2006.01)

(52) U.S. Cl.
USPC ............ 370/328; 370/230; 370/238; 709/228

(58) Field of Classification Search
USPC .......... 370/216–236, 252–329; 455/417–435; 709/235–450
See application file for complete search history.

(56) References Cited

U.S. PATENT DOCUMENTS 7,106,718 B2 * 9/2006 Oyama et al. ................. 370/340
7,139,242 B2 * 11/2006 Bays ............................. 370/238
(Continued)

FOREIGN PATENT DOCUMENTS

EP    1 933 520 A1    6/2008
JP    2007281623 A    10/2007
(Continued)

OTHER PUBLICATIONS

International Search Report, dated May 7, 2010, from corresponding PCT application.
C. Larsson et al., "A Filter Rule Mechanism for Multi-access Mobile IPv6 draft-larsson-monami6-filter-rules-02", IETF Standard-Working-Draft, Internet Engineering Task Force, Mar. 5, 2007, pp. 1-24; Cited in International Search Report.
Japanese Office Action dated Nov. 14, 2012, from corresponding JP application.

*Primary Examiner* — Man Phan
(74) *Attorney, Agent, or Firm* — Young & Thompson (57) ABSTRACT

A radio network allows a flexible distribution of data flows between a mobile station and a mobility anchor of the network over different interfaces. Data flows are routed between at least one mobile station and a mobility anchor of the network. The mobile station can connect to the mobility anchor using multiple network interfaces simultaneously, the radio network including an application function capable of processing and/or analyzing information about routing policies contained in a signalling received from a mobile station, which is able to push or signal the processed and/or analyzed information from the application function to an entity that can enforce routing policies to forward the data flows to one or more selected interfaces and which is able to signal routing policies received from the network to the mobile station. Further, an according method for operating a radio network, especially for routing data flows within the network, is disclosed.

27 Claims, 6 Drawing Sheets

(56) References Cited

U.S. PATENT DOCUMENTS

| | | |
|---|---|---|
| 7,260,645 B2 * | 8/2007 | Bays ............................... 709/238 |
| 7,328,014 B2 * | 2/2008 | Takeda et al. .............. 455/435.1 |
| 7,606,914 B2 * | 10/2009 | Ikeda et al. ................... 709/228 |
| 7,773,533 B2 * | 8/2010 | Bays ............................... 370/248 |
| 7,907,524 B2 * | 3/2011 | Willars et al. ................. 370/230 |
| 7,929,435 B2 | 4/2011 | Ono et al. |
| 8,040,845 B2 * | 10/2011 | Oulai et al. ................... 370/329 |
| 8,174,994 B2 * | 5/2012 | Forssell et al. ................ 370/252 |
| 8,223,635 B2 * | 7/2012 | Song ............................. 370/229 |
| 8,379,599 B2 * | 2/2013 | Velev et al. ................... 370/331 |
| 2006/0259951 A1 | 11/2006 | Forssell et al. |
| 2007/0074281 A1 * | 3/2007 | Ikeda ............................. 726/13 |

FOREIGN PATENT DOCUMENTS

| | | |
|---|---|---|
| JP | 2008538475 A | 10/2008 |
| JP | 2008283538 A | 11/2008 |
| JP | 2009526424 A | 7/2009 |
| WO | 2004105272 A1 | 12/2004 |
| WO | 2007060731 A1 | 5/2007 |
| WO | 2007/087828 A1 | 8/2007 |

* cited by examiner

RADIO NETWORK AND A METHOD FOR OPERATING A RADIO NETWORK

BACKGROUND OF THE INVENTION

1. Field of the Invention

The present invention relates to a radio network, wherein data flows are routed between at least one mobile station and a mobility anchor of the network and wherein the mobile station can connect to the mobility anchor using multiple network interfaces simultaneously. Further, the present invention relates to a method for operating a radio network, especially for routing data flows within the network, wherein data flows are routed between at least one mobile station and a mobility anchor of the network and wherein the mobile station can connect to the mobility anchor using multiple network interfaces simultaneously.

2. Description of the Related Art

Radio networks of the above type are known from different applications. Current standards for network based mobility are obtainable from S. Gundavelli, K. Leung, V. Devarapalli, K. Chowdhury, B. Patil, *Proxy Mobile IPv6*, RFC 5213, August 2008. Such standards have limited support for multi-mode enabled mobile-stations according to V. Devarapalli, N. Kant, H. Lim, C. Vogt, *Multiple Interface Support with Proxy Mobile IPv6*, draft-devarapalli-netlmm-multihoming-03.txt, work in progress, August 2008, which can attach to the network infrastructure using multiple network interfaces simultaneously. The benefit of enabling such operation mode is to provide enhanced services such as flow distribution, load sharing, network resilience or aggregation of wireless bandwidth.

These enhanced services require mechanisms to perform forwarding decisions based on routing policies, for uplink and downlink traffic within a local domain. Use of multiple PDN (Packet Data Network) connections simultaneously to route data flows are currently design requirements and accepted work items in the 3GPP (Third Generation Partnership Project) standardization body. However, the considered use cases focus on limited and static configuration of routing policies, see for example 3GPP SA WG2, TD S2-086386, *Work Item Description for Multi Access PDN connectivity and IP Flow Mobility*, August 2008. Dynamic routing policies and some associated use cases require the set up of routing policies on both, mobile stations and network components, such as the Packet Data Network (PDN) Gateway. Both, the mobile station and its mobility anchor need to be synchronized regarding the current routing policies allowing for uplink and downlink traffic regarding one flow to use the same interface.

Such mechanisms are not considered in the current state of the art within 3GPP where the PCC (Policy and Charging Control) component—see 3GPP TS 23.203, V8.2.0, *Policy and Charging Control Architecture (Release 8)*—provides a mechanism to enforce Quality-of-Service (QoS) control and charging on designated gateways in the network but provides no information regarding routing policies. This is in particular a problem for network-based mobility management, as a direct interface between the mobile terminal and the relevant component for routing policy enforcement is not foreseen.

From 3GPP TS 23.228, V8.6.0, *IP Multimedia Subsystem, Stage 2(Release 8)* are obtainable IP Multimedia Subsystems (IMS) which can be part of the above mentioned network environments.

A mobile station or a multi-mode User Equipment (UE), which has multiple radio interfaces, attaching to such a network would normally be assigned different network prefixes for each interface and thus configure itself with a different IP address on each interface. In this situation any session starting over an interface would have all respective flows routed through/from the same interface and each interface would be considered in a separate entry at the PDN GW (Packet Data Network Gateway).

Regarding more advanced scenarios, where the network assigns the same network prefix to the UE and it is allowed to configure the same IP address on both interfaces, there is currently no mechanism to allow the PDN GW to decide, for example, on which Serving GW (Gateway) to forward a downlink flow without any further policies. In the current scenario, no aggregation or distribution of flows over different interfaces is considered.

BRIEF SUMMARY OF THE INVENTION

It is an object of the present invention to improve and further develop a radio network and an according method for operating a radio network of the above mentioned type for allowing a flexible distribution of data flows between a mobile station and the mobility anchor over different interfaces.

In accordance with the invention, the aforementioned object is accomplished by a radio network and a method for operating a radio network. The network is characterized by an application function, which is capable of processing and/or analyzing information about routing policies contained in a signalling received from a mobile station, which is able to push or signal the processed and/or analyzed information from the application function to an entity that can enforce routing policies to forward the data flows to one or more selected interfaces and which is able to signal routing policies received from the network to the mobile station.

The method for operating a radio network is characterized by the provision of an application function, which is capable of processing and/or analyzing information about routing policies contained in a signalling received from a mobile station, which is able to push or signal the processed and/or analyzed information from the application function to an entity that can enforce routing policies to forward the data flows to one or more selected interfaces and which is able to signal routing policies received from the network to the mobile station.

According to the invention there is provided an application function which is capable of processing signalling from a mobile station and which is able to push the processed information to entities that can enforce routing policies to forward the traffic towards the selected interface of the attached mobile station. It has been recognized that it is possible to allow a flexible distribution of data flows between a mobile station and the mobility anchor over different interfaces by providing an application function which is able to signal routing policies from the network to the mobile station and from the mobile station to the network. Thus, a bi-directional signalling and communication between a mobile station and a mobility anchor of the network is possible. The established routing policies then allow flexible distribution of uplink and downlink flows over the different interfaces and network connections.

By the term "capable of processing signalling" is meant that the application function is capable of analyzing the information contained in the signalling and further use it, regardless of terminating the signalling or just being in the path (proxy).

Within a preferred embodiment the application function is a Routing Policy Control or Configuration Function (RPCF).

The control and/or configuration of routing policies is possible by the use of the application function.

Within a further preferred embodiment the application function has a direct interface towards the mobile station and another interface towards the mobility anchor. The interface between the application function and the mobility anchor or the network can be indirect, i.e. further network components can be provided in a communication path between the application function and the mobility anchor.

With regard to a very effective resource consumption the protocol between the mobile station and the application function carries information about routing policies. Further, the protocol between the application function and the entity could carry information about routing policies. Thus, there is provided an extension of existing signalling protocols in order to carry information about the selected interface to route each individual flow. The information about routing policies could comprise the selected interface or interfaces for each data flow and/or flow identification keys. The extension of protocol between application function and the entity could also provide information about routing policies, for example the selected interface for each flow and/or flow identification keys.

The protocol and/or information flow could be bi-directional, which allows mobile stations to send routing policies to the network and the network to send routing policies to mobile stations. This could allow that routing policies are provided or set up on both, mobile station and network or mobility anchor.

Within a further preferred embodiment the application function could be able to use routing information to configure relevant network entities involved in routing flows between the mobile station and the mobility anchor and/or network. Especially the installation of flow routing policies on relevant network entities and mobile stations is possible. Thus, the mobile station and the network or mobility anchor could be synchronized regarding current routing policies.

Preferably, the interface or interfaces could additionally or alternatively be used to negotiate routing policies between the mobile station and the network or mobility anchor. This could provide a very flexible provision of routing policies within the components being involved in communication.

With regard to a very flexible operation of the network the routing policies could allow flexible distribution of uplink and downlink flows over the different interfaces using dynamic rules.

Depending on individual situations a flexible integration of the application function into the network infrastructure could be possible. The application function could be assigned to or integrated into the network or network infrastructure or an existing network component. A co-location of the application function with existing network components is possible. For example, the application function could be assigned to or integrated into the routing policy enforcing entity. Alternatively, the application function could be assigned to or integrated into a PCRF (Policy and Charging Rules Function) or a P-CSCF (Proxy Call Session Control Function). In the last mentioned situation the routing policy rules could be provisioned to the mobile station via OMA DM (Open Mobile Alliance Device Management).

As a further preferred alternative, the application function could be assigned to or integrated into an application server. Such an application server could be a new component within an existing network.

With regard to a very reliable distribution of data flows the routing policy synchronization could be done directly between mobile station and application function application server. The application function or the application function application server could get triggered by an S-CSCF (Serving Call Session Control Function) with corresponding iFCs (initial Filter Criteria). Further, within a preferred embodiment the application function could further analyze the SDP (Session Description Protocol) of the SIP INVITE (Session Initiation Protocol request) and the corresponding P-Access-Network-Info header which is set by the mobile station. If the P-Access-Network-Info header is missing, the application function or application server could query a GMLC (Gateway Mobile Location Center) for further location and/or routing information of the mobile station.

In case of non-IMS flows using the same mechanism a processing or termination of the signaling of a mobile station at the new application function is possible. This can be done by addressing directly a sip URI (Uniform Resource Identifier) located at the new application function, for example.

Preferably, the mobile station could be a multi-mode enabled mobile station. Thus, different radio communication technologies can be used simultaneously with the same mobile station. Thus, a very flexible communication between mobile station and radio network is possible.

Depending on the used radio communication technology the routing of the flows could be enforced over a selected Serving Gateway (SGW) or Access Gateway (AGW). Within 3GPP technology server gateways are provided.

Within a preferred embodiment the routing policies enforcing entity could comprise a PCEF (Policy Control Enforcement Function) which is assigned to the mobility anchor. The mobility anchor could be a PDN GW (Packet Data Network Gateway).

Important aspects and advantages of the present invention are summarized in the following:

The present invention enables indirect and bi-directional signaling between a mobile terminal or station and a routing policy enforcing entity, such as the PDN GW, hence does not mandate an unwanted direct protocol interface between these network entities.

Further, the invention introduces a new Application Function in the network, serving as contact point and signaling gateway for mobile devices or stations to configure routing policies.

Additionally, the present invention conforms to standards, as integration of the new Application Function can extend existing network and protocol interfaces.

Further, the invention supports a missing function to enable new services and use cases for multi-homing and flow distribution in future mobile communication systems and standards, such as the 3GPP.

According to a further respect, the invention enables UEs (User Equipment) to configure routing policies in the network and on relevant network infrastructure components—routing policy enforcing components such as mobility anchors—which do not have a direct signalling interface with UEs, and enables routing policy negotiation with the network.

Mobile stations can send/receive signalling to/from the routing policy control or configuration function to configure routing policies on the mobile station and on relevant policy routing enforcement entities in the network, such as the PDN Gateway.

The routing policy control or configuration function can have a bi-directional protocol with a network entity, which serves as Policy and Charging Rules Function to send/receive routing policy rules.

An existing Diameter protocol between application functions and the Policy and Charging Rules Function can be extended to suit signalling of routing policies.

The Policy and Charging Rules Function can extend its protocol interface to the routing policy enforcement function to signal routing policies. The existing Diameter protocol interface can be extended to allow such signalling.

The Session Initiation Protocol (SIP) can be used between the mobile station and the routing policy control or configuration function to signal routing policies.

Other protocol formats can be used between the mobile station and the application function to signal routing policies.

Acronyms:
- IMS: IP Multimedia Subsystem
- PCRF: Policy and Charging Rules Function
- P-CSCF: Proxy Call Session Control Function
- S-CSCF: Serving Call Session Control Function
- I-CSCF: Interrogating Call Session Control Function
- PCC: Policy and Charging Control
- PDN GW: Packet Data Network Gateway
- S GW: Serving Gateway
- RPC: Routing Policy Control
- AS: Application Server
- UE: User Equipment (also mobile station or mobile terminal in this context)

BRIEF DESCRIPTION OF THE DRAWINGS

There are several ways how to design and further develop the teaching of the present invention in an advantageous way. To this end, it is to be referred to the patent claims, and to the following explanation of preferred examples of embodiments of the invention illustrated by the drawing on the other hand. In connection with the explanation of the preferred examples of embodiments of the invention by the aid of the drawing, generally preferred embodiments and further developments of the teaching will be explained. In the drawings

DETAILED DESCRIPTION OF THE PREFERRED EMBODIMENTS

Figure 1:
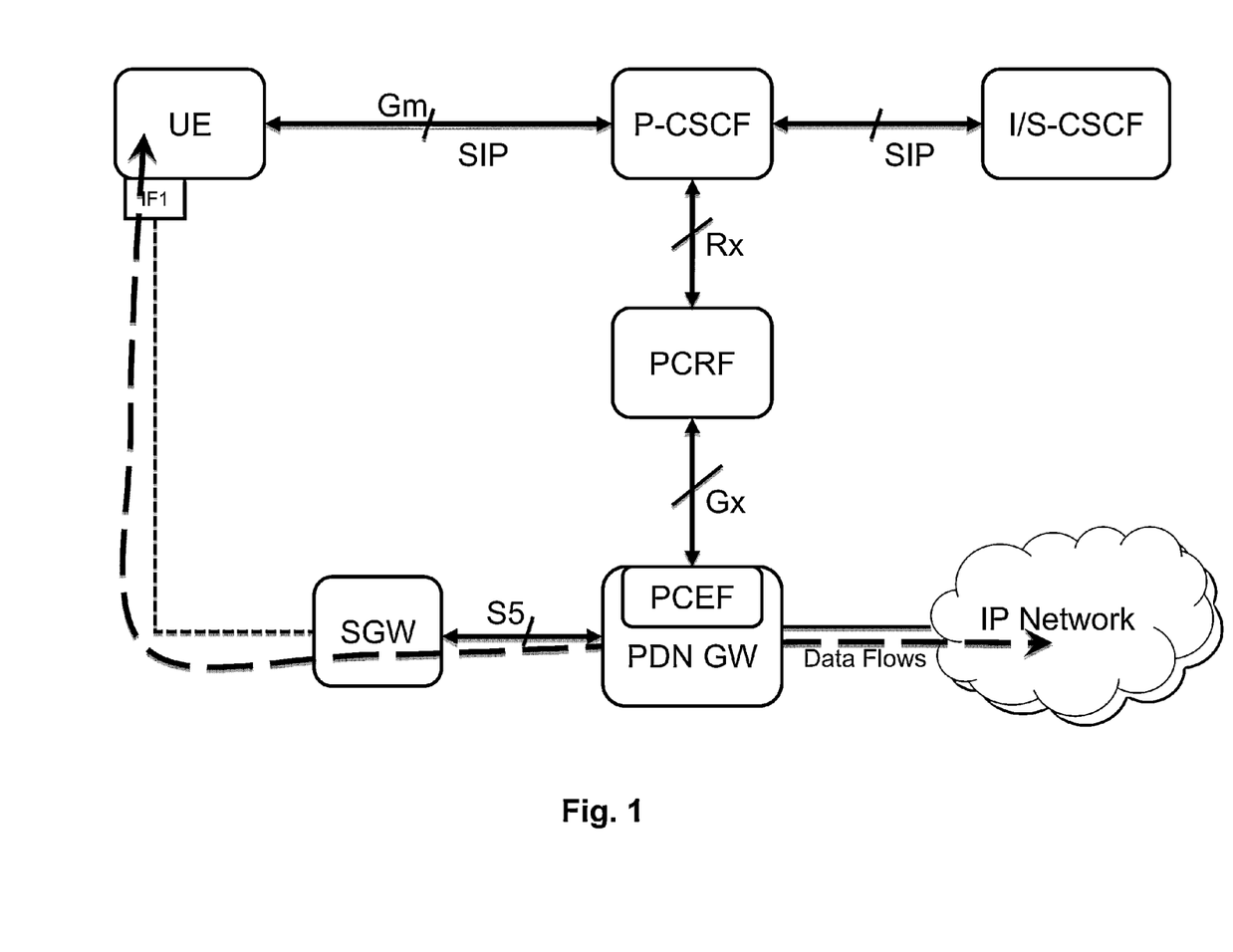
FIG. 1 is illustrating a current integrated PCC architecture.

FIG. 1 exemplarily depicts the main functional elements defined in the current 3GPP Policy and Charging Control (PCC) architecture and also a part of the functional entities involved in IP Multimedia Subsystem (IMS) sessions setup.

The PCC framework of a radio network works in the following way:

1) The UE or mobile station or terminal issues a Session Initiation Protocol (SIP) request (INVITE) towards a peer to initiate a session, using the Gm interface.
2) The request reaches the P-CSCF and the Session Description Protocol (SDP) body is inspected in order to retrieve information about each of the proposed flows (type of flow, source IP, receiving port, codec, bandwidth). It is then passed to the S-CSCF in order to route it to the peer.
3) When the peer replies with the SIP message (200 OK), the P-CSCF gathers the remaining information about each of the flows for the session (accepted flows, destination IP, destination port, codec, bandwidth).
4) The P-CSCF then formulates a Diameter Authorize-Authenticate-Request (AAR) message and sends it to the PCRF using the Rx interface. This message contains the gathered information about the flows.
5) The PCRF stores the information, possibly adds values from user profile (static rules) and authorizes the request.
6) The PCRF pushes the information with another Diameter message (Re-Auth-Request) using the Gx interface towards the PCEF.

The Policy Control Enforcement Function (PCEF) is then responsible for enforcing QoS and charging rules according to the request from the terminal matched with the authorization from the user profile.

Between the PDN GW and the UE is further provided a SGW (Serving Gateway). The SGW is connected with IF1 (Interface 1).

The I/S-CSCF component could be assigned to an IMS-Server.

Figure 2:
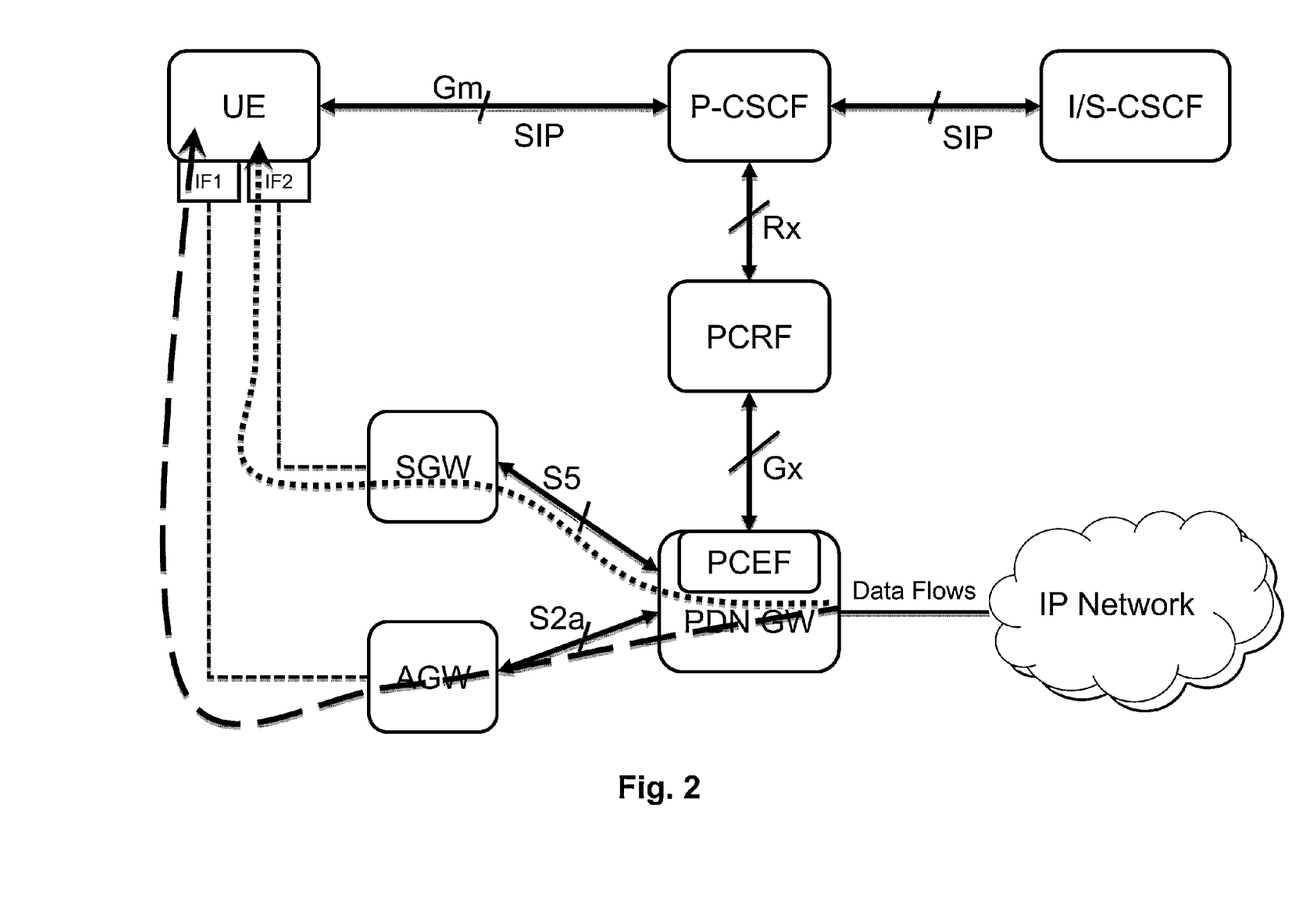
FIG. 2 is illustrating a current integrated PCC architecture with multi-mode support.

FIG. 2 is illustrating an integrated PCC architecture according to FIG. 1, further comprising a multi-mode support. A multi-mode User Equipment (UE), which has multiple radio interfaces, attaching to such a network would normally be assigned different network prefixes for each interface and thus configure itself with different IP address on each interface (IF1 and IF2). In this situation any session starting over an interface would have all respective flows routed through/from the same interface and each interface would be considered in a separate entry at the PDN GW.

The PDN GW in FIGS. 1 and 2 is providing the mobility anchor of the network. FIG. 2 is further comprising an Access Gateway (AGW) in connection with Interface 1 (IF 1).

Regarding more advanced scenarios, where the network assigns the same network prefix to the UE and it is allowed to configure the same IP interface on both interfaces, there is currently no mechanism to allow the PDN GW to decide, for example, on which Serving GW to forward a downlink flow without any further policies. In the current scenario, no aggregation or distribution of flows over different interfaces is considered.

Figure 3:
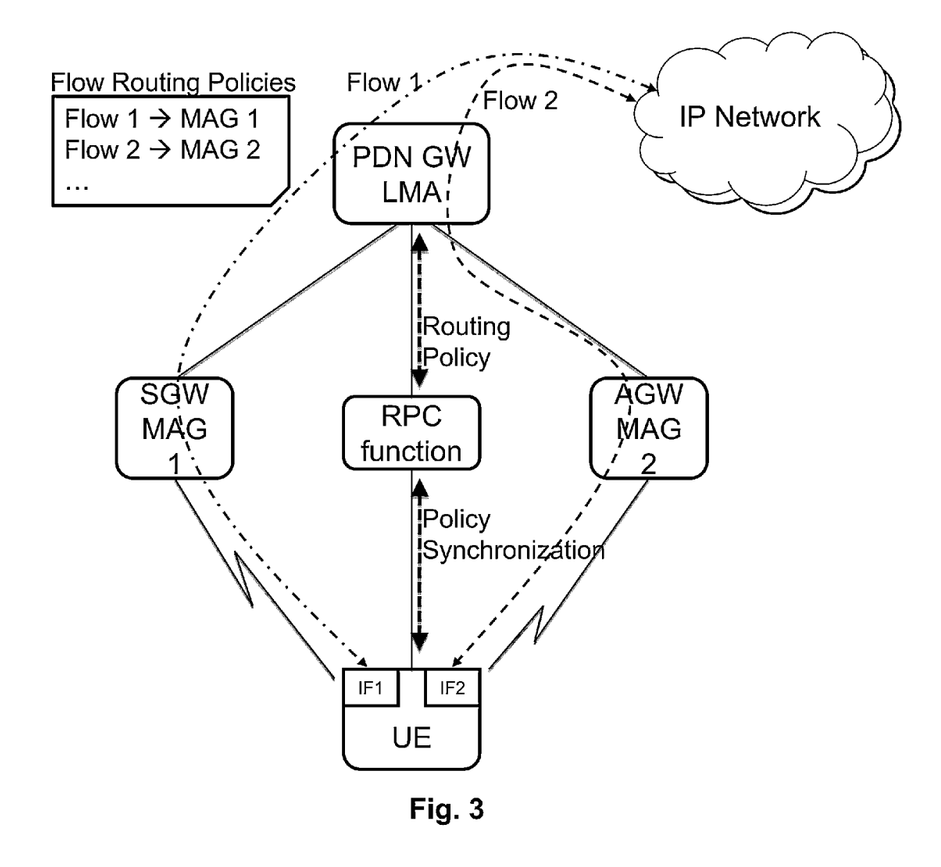
FIG. 3 is illustrating an embodiment of the present invention with a generic application function for policy synchronization and configuration.

FIG. 3 is showing an embodiment of the present invention, where the RPCF (Routing Policy Control or Configuration Function) is introduced. The present invention is able to provide and synchronize the required information for policy routing at the relevant entities, which is the UE and PDN GW.

The RPCF is a new functional element located in the network which has a direct interface towards the UE and another towards the PDN GW.

Important aspects of this embodiment and the following embodiments are:

Introduction of a new application function (RPCF) in the network, serving as Routing Policy Control or Configuration Function, which processes signaling about routing policies from a UE and also enables notification of UEs about the network's routing policies. Such bi-directional signaling enables negotiation of routing policies between UEs and the network.

Furthermore, this function is able to use the information to configure relevant network entities (PDN GW) involved in routing flows towards the UE.

Extending the information passed on the interface between the UE and the network entity, for example the Gm (SIP) interface, to carry information about the selected interface and route for each of the session's flows.

Extending the information passed on the network entities interfaces, for example Rx and Gx (diameter) interfaces to carry information about the selected interface and route for each of the session's flows.

Allow processing/termination of the signaling at the new Application Function in case of non-IMS flows using the same mechanism. This can be done by addressing directly a sip URI located at the new Application Function, for example.

Enforcing the routing of the flows over the selected Serving GW or Access GW at the PCEF according to the received rules.

Allow the reverse operation, in which the RPCF is responsible for configuring the UE and PDN GW based on local policies—dynamic or static—, instead of receiving the information from the UE.

Instead of a PDN GW a LMA (Local Mobility Anchor according to IETF (International Engineering Task Force)) can be used. Thus, instead of SGW and AGW an MAG 1 or MAG 2 (Mobility Access Gateway) can be used. AGWs are used for non-3GPP access technology.

The established routing policies allow flexible distribution of uplink and downlink flows over the different interfaces 1 and 2 and PDN connections using dynamic rules.

The interface from RPCF towards the PDN GW can also be indirect with an intermediate function in between in order to achieve an easier mapping into the 3GPP IMS and PCC architectures.

Figure 4:
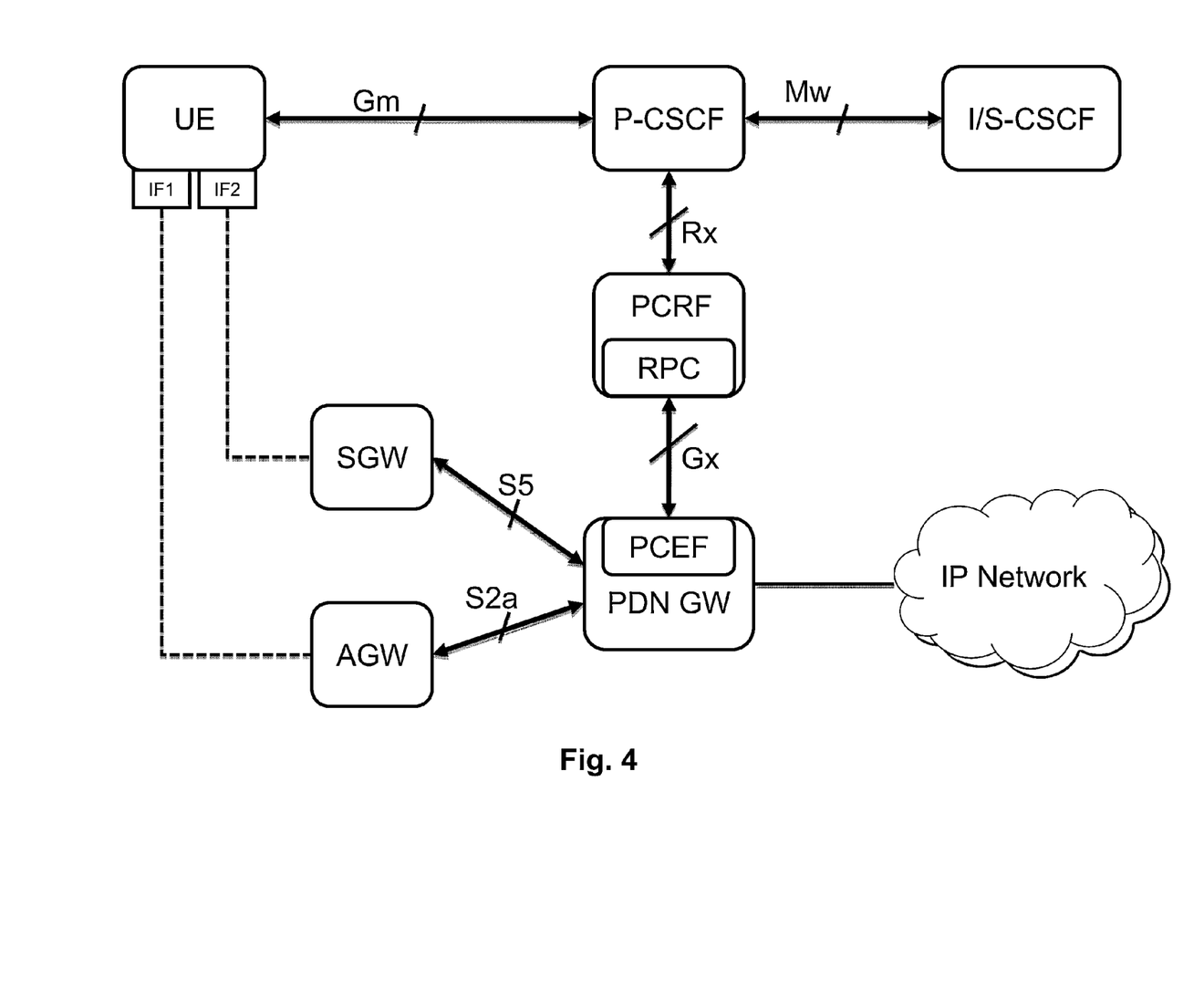
FIG. 4 is illustrating a further embodiment of the present invention, where the application function is co-located with the PCRF.
Figure 5:
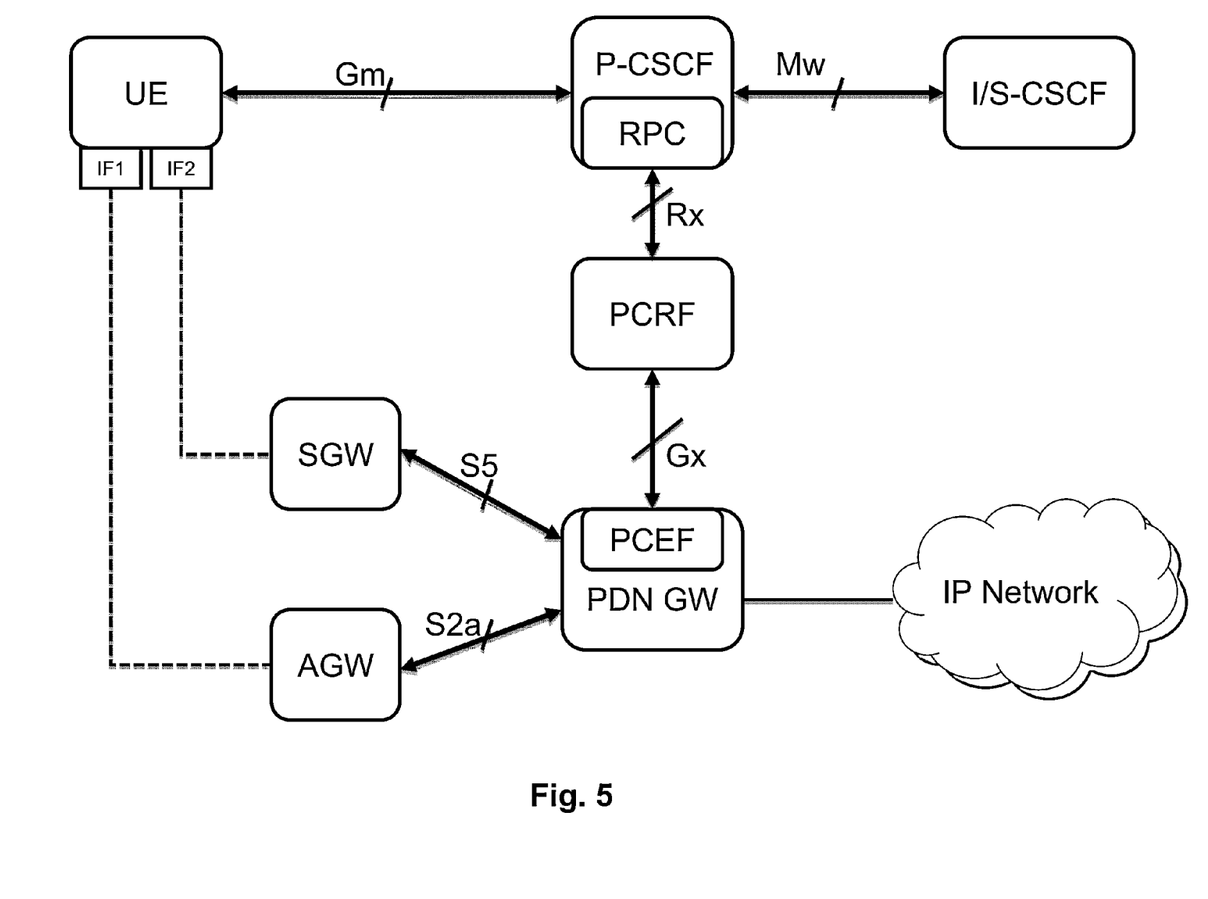
FIG. 5 is illustrating a further embodiment of the invention, where the application function is co-located with the P-CSCF.
Figure 6:
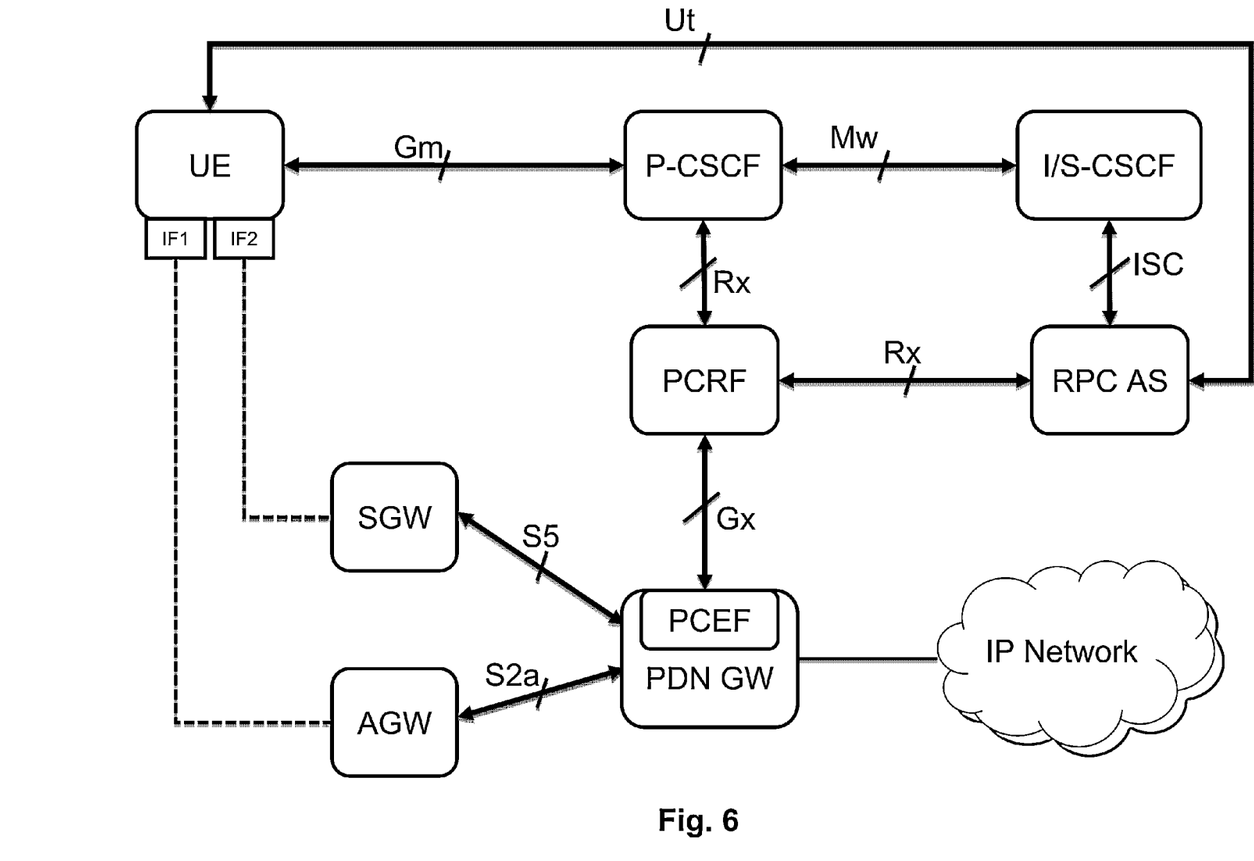
FIG. 6 is illustrating a further embodiment of the invention, where the application function is implemented in an application server.

Examples of deploying the RPCF in a 3GPP environment for IMS controlled services are shown in FIGS. 4 to 6.

In the embodiment shown in FIG. 4 the RPCF is implemented in the PCRF. This would limit the functionality to bind the access network interface to the one, where the service request is received by the P-CSCF.

In the embodiment shown in FIG. 5 the RPCF is implemented in the P-CSCF. The RPCF analyses the SDP of the SIP INVITE and the corresponding P-Access-Network-Info header which is set by the UE. If the P-Access-Network-Info header is missing, the RPCF could query the GMLC for further location and routing information of the UE. This information would be then applicable only for all flows requested. The Policy Routing rules need to be provisioned to the UE e.g. via OMA DM (Open Mobile Alliance Device Management). The SDP and SIP INVITE could contain requests for multiple flows over different IP-CANs (IP Connectivity Access Network), then the P-Access-Network-Info header needs to be included for each service flow request.

The P-Access-Network-Info header is comprising information about the network. Via said network an user equipment UE can connect to the SIP server. This information can be used by the home network for providing information with regard to the connection of the UE to the network infrastructure (Access Network UMTS, Wireless LAN, etc.).

A message comprising the P-Access-Network-Info header is also passing through the P-CSCF which is comprising the RPCF within the embodiment of FIG. 5. The RPCF could gather routing information form the P-Access-Network-Info header and transmit this routing information to the PCRF. If the P-Access-Network-Info header is missing, the RPCF could query the GMLC for further location information and corresponding routing information.

The letter "P" with regard to P-Access-Network-Info header means "private" according to 3GPP.

FIG. 6 is illustrating a further embodiment, wherein the RPC functionality is implemented in an application server AS. Routing Policy rule synchronization can be done via interface Ut directly between UE and RPC AS (Routing Policy Control or Configuration Application Server). The RPC AS gets triggered by the S-CSCF with corresponding iFCs (initial Filter Criteria) and the RPC AS further analyses the SDP of the SIP INVITE and the corresponding P-Access-Network-Info header which is set by the UE. If the P-Access-Network-Info header is missing, the RPC AS could query the GMLC for further location and routing information of the UE. This information would be then applicable only for all flows requested. SDP and SIP INVITE could contain requests for multiple flows over different IP-CANS, then the P-Access-Network-Info header needs to be included for each service flow request.

Within the present invention can be provided two policy enforcement points at the mobile station and at the mobility anchor.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A radio network, comprising:
    at least one mobile station;
    a mobility anchor of the network, data flows being routed between the mobile station and the mobility anchor of the network, the mobile station connecting to the mobility anchor using multiple network interfaces simultaneously; and
    one or more processors of the network configured to execute an application function to process and/or analyze information about routing policies contained in a signaling received from the mobile station, the application function causing the one or more processors to push or signal the processed and/or analyzed information from the one or more processors executing the application function to an entity of the network that can enforce the routing policies to forward the data flows to one or more selected interfaces, the application function causing the one or more processors to signal the routing policies received from the network to the mobile station so that the application function facilitates bi-directional signaling of the routing policies between the mobile station and the mobility anchor of the network, which allows the mobile station to send the routing policies to the network and the network to send the routing policies to the mobile station.

2. The radio network according to claim 1, wherein the application function is a Routing Policy Control or Configuration Function (RPCF).

3. The radio network according to claim 1, wherein the application function has a direct interface towards the mobile station and another interface towards the mobility anchor.

4. The radio network according to claim 1, wherein a protocol between the mobile station and the application function carries information about the routing policies.

5. The radio network according to claim 1, wherein a protocol between the application function and the entity carries information about the routing policies.

6. The radio network according to claim 1, wherein the information about routing policies comprises the selected interface or interfaces for each data flow and/or flow identification keys.

7. The radio network according to claim 1, wherein a protocol and/or an information flow is bi-directional.

8. The radio network according to claim 1, wherein the routing policies are provided or set up on the mobile station and the network or the mobile station and the mobility anchor.

9. The radio network according to claim 1, wherein the application function is able to use routing information to configure relevant network entities involved in routing flows between the mobile station and the mobility anchor and/or the network.

10. The radio network according to claim 1, wherein the mobile station and the network or mobility anchor are synchronized regarding current routing policies.

11. The radio network according to claim 1, wherein the selected interface or interfaces are used to negotiate the routing policies between the mobile station and the network or the mobility anchor.

12. The radio network according to claim 1, wherein the routing policies allow flexible distribution of uplink and downlink flows over different interfaces using dynamic rules.

13. The radio network according to claim 1, wherein the application function is assigned to or integrated into one or more of the network, an infrastructure of the network, and an existing network component.

14. The radio network according to claim 1, wherein the application function is assigned to or integrated into a routing policy enforcing entity.

15. The radio network according to claim 1, wherein the application function is assigned to or integrated into a Policy and Charging Rules Function (PCRF).

16. The radio network according to claim 1, wherein the application function is assigned to or integrated into a Proxy Call Session Control Function (P-CSCF).

17. The radio network according to claim 16, wherein routing policy rules are provisioned to the mobile station via an Open Mobile Alliance Device Management (OMA DM).

18. The radio network according to claim 1, wherein the application function is assigned to or integrated into an application server.

19. The radio network according to claim 18, wherein routing policy synchronization occurs directly between the mobile station and the application server.

20. The radio network according to claim 18, wherein the application function or the application server gets triggered by a Serving Call Session Control Function (S-CSCF) with corresponding initial Filter Criteria (iFCs).

21. The radio network according to claim 16, wherein the application function queries a Gateway Mobile Location Center (GMLC) for location and/or routing information of the mobile station.

22. The radio network according to claim 1, wherein a sip Uniform Resource Identifier (URI) located at the application function is directly addressed.

23. The radio network according to claim 1, wherein the mobile station is a multi-mode enabled mobile station.

24. The radio network according to claim 1, wherein the routing of the flows is enforced over a selected Serving Gateway (SGW) or Access Gateway (AGW).

25. The radio network according to claim 1, wherein the entity is comprising a Policy Control Enforcement Function (PCEF) which is assigned to the mobility anchor.

26. The radio network according to claim 1, wherein the mobility anchor is a Packet Data Network Gateway (PDN GW).

27. A method for operating a a radio network according to claim 1, for routing data flows within the network, the method comprising:

routing the data flows between the at least one mobile station and the mobility anchor of the network, the mobile station being configured to connect to the mobility anchor using the multiple network interfaces simultaneously;

processing and/or analyzing the information, by the application function executed by the one or more processors, about routing policies contained in the signaling received from the mobile station, the processed and/or analyzed information being able to be pushed or signaled from the application function to the entity that can enforce routing policies to forward the data flows to the one or more selected interfaces, the application function causing the one or more processors to signal routing policies received from the network to the mobile station so that the application function facilitates bi-directional signaling of the routing policies between the mobile station and the mobility anchor of the network, which allows the mobile station to send the routing policies to the network and the network to send the routing policies to the mobile station.

* * * * *

UNITED STATES PATENT AND TRADEMARK OFFICE
CERTIFICATE OF CORRECTION

PATENT NO. : 8,660,065 B2  Page 1 of 1
APPLICATION NO. : 13/140863
DATED : February 25, 2014
INVENTOR(S) : Liebsch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 269 days.

Signed and Sealed this

Twenty-ninth Day of September, 2015

Michelle K. Lee
*Director of the United States Patent and Trademark Office*